United States Patent
Mu et al.

(10) Patent No.: US 12,436,864 B2
(45) Date of Patent: Oct. 7, 2025

(54) PERFORMANCE TESTING METHOD AND APPARATUS, AND STORAGE MEDIUM

(71) Applicant: Beijing Baidu Netcom Science Technology Co., Ltd., Beijing (CN)

(72) Inventors: Yakun Mu, Beijing (CN); Chaoping Ji, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 425 days.

(21) Appl. No.: 17/965,066

(22) Filed: Oct. 13, 2022

(65) Prior Publication Data

US 2023/0267060 A1  Aug. 24, 2023

(30) Foreign Application Priority Data

Feb. 21, 2022 (CN) .......................... 202210157035.0

(51) Int. Cl.
 *G06F 11/34* (2006.01)
 *G06F 9/48* (2006.01)

(52) U.S. Cl.
 CPC ........ *G06F 11/3452* (2013.01); *G06F 9/4881* (2013.01)

(58) Field of Classification Search
 CPC ........................ G06F 11/3452; G06F 9/4881
 See application file for complete search history.

(56) References Cited

U.S. PATENT DOCUMENTS

2013/0179144 A1   7/2013 Lu et al.

FOREIGN PATENT DOCUMENTS

| CN | 105446860 A | * | 3/2016 | .......... G06F 11/3495 |
|----|-------------|---|--------|-----------------------|
| CN | 106855843 A |   | 6/2017 |                       |
| CN | 110147315 A |   | 8/2019 |                       |
| CN | 110262953 A |   | 9/2019 |                       |
| CN | 111078478 A |   | 4/2020 |                       |
| CN | 113704031 A |   | 11/2021|                       |

(Continued)

OTHER PUBLICATIONS

Office Action issued on Jun. 8, 2023 by the CIPO in the corresponding Patent Application No. 202210157035.0, with English translation.

(Continued)

*Primary Examiner* — Diem K Cao
(74) *Attorney, Agent, or Firm* — NORTON ROSE FULBRIGHT US LLP

(57) ABSTRACT

Performance testing method and apparatus, an electronic device, and a storage medium, which relate to the field of computer technology and, for example, the field of cloud computing and server technology. The specific implementation includes: in response to determining that current first performance information of a server does not satisfy a predetermined condition, updating current first concurrency according to the first performance information to obtain second concurrency; performing pressure testing on the server according to the second concurrency to obtain second performance information of the server; and in response to determining that the first performance information satisfies the predetermined condition, performing a task allocation operation of the server according to the first concurrency.

9 Claims, 4 Drawing Sheets

(56) References Cited

FOREIGN PATENT DOCUMENTS

| CN | 113778844 A | 12/2021 |
| CN | 113986733 A | 1/2022 |
| EP | 3142012 A1 | 3/2017 |
| WO | 2020140369 A1 | 7/2020 |
| WO | 2020253079 A1 | 12/2020 |

OTHER PUBLICATIONS

Search Report issued on Jun. 7, 2023 by the CIPO in the corresponding Patent Application No. 202210157035.0, with English translation.
Supplemental Search Report issued on Jan. 4, 2024 by the CIPO in the corresponding Patent Application No. 202210157035.0, with English translation.
European Search Report issued on Jul. 4, 2023 in the corresponding patent application No. 22199736.4-1203.

* cited by examiner

PERFORMANCE TESTING METHOD AND APPARATUS, AND STORAGE MEDIUM

CROSS-REFERENCE TO RELATED APPLICATION

This application claims priority to Chinese Patent Application No. CN202210157035.0, filed on Feb. 21, 2022, the disclosure of which is incorporated herein by reference in its entirety.

TECHNICAL FIELD

The present disclosure relates to the field of computer technology and, for example, the field of cloud computing and server technology and, in particular, to a performance testing method and apparatus, an electronic device, and a storage medium.

BACKGROUND

With more and more business services, users pay much attention to the performance and functions of the business services. Thus, the testing of a business service is especially important to ensure the quality of the business service.

Performance testing is an indispensable part of software quality assurance. The actual operation situation of software under high pressure needs to be verified through the performance testing, so as to detect a bottleneck in advance and then repair and improve the software.

SUMMARY

The present disclosure provides a performance testing method and apparatus, an electronic device, and a storage medium.

According to an aspect of the present disclosure, a performance testing method is provided. The method includes the steps described below.

In response to determining that current first performance information of a server does not satisfy a predetermined condition, current first concurrency is updated according to the first performance information so that second concurrency is obtained.

Pressure testing is performed on the server according to the second concurrency so that second performance information of the server is obtained.

In response to determining that the first performance information satisfies the predetermined condition, a task allocation operation of the server is performed according to the first concurrency.

According to an aspect of the present disclosure, a performance testing apparatus is provided. The apparatus includes a first concurrency update module, a pressure testing module, and a task allocation module.

The first concurrency update module is configured to: in response to determining that current first performance information of a server does not satisfy a predetermined condition, update current first concurrency according to the first performance information to obtain second concurrency.

The pressure testing module is configured to perform pressure testing on the server according to the second concurrency to obtain second performance information of the server.

The task allocation module is configured to: in response to determining that the first performance information satis- fies the predetermined condition, perform a task allocation operation of the server according to the first concurrency.

According to another aspect of the present disclosure, an electronic device is provided. The electronic device includes at least one processor and a memory communicatively connected to the at least one processor.

The memory stores an instruction executable by the at least one processor to enable the at least one processor to perform the performance testing method according to any embodiment of the present disclosure.

According to another aspect of the present disclosure, a non-transitory computer-readable storage medium is provided. The non-transitory computer-readable storage medium is configured to store a computer instruction for causing a computer to perform the performance testing method according to any embodiment of the present disclosure.

According to another aspect of the present disclosure, a computer program product is provided. The computer program product includes a computer program which, when executed by a processor, causes the processor to perform the performance testing method according to any embodiment of the present disclosure.

Embodiments of the present disclosure can improve the efficiency of performance testing and the reliability of a server.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF THE DRAWINGS

The drawings are intended to provide a better understanding of the solution and not to limit the present disclosure. In the drawings.

DETAILED DESCRIPTION

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

Figure 1:
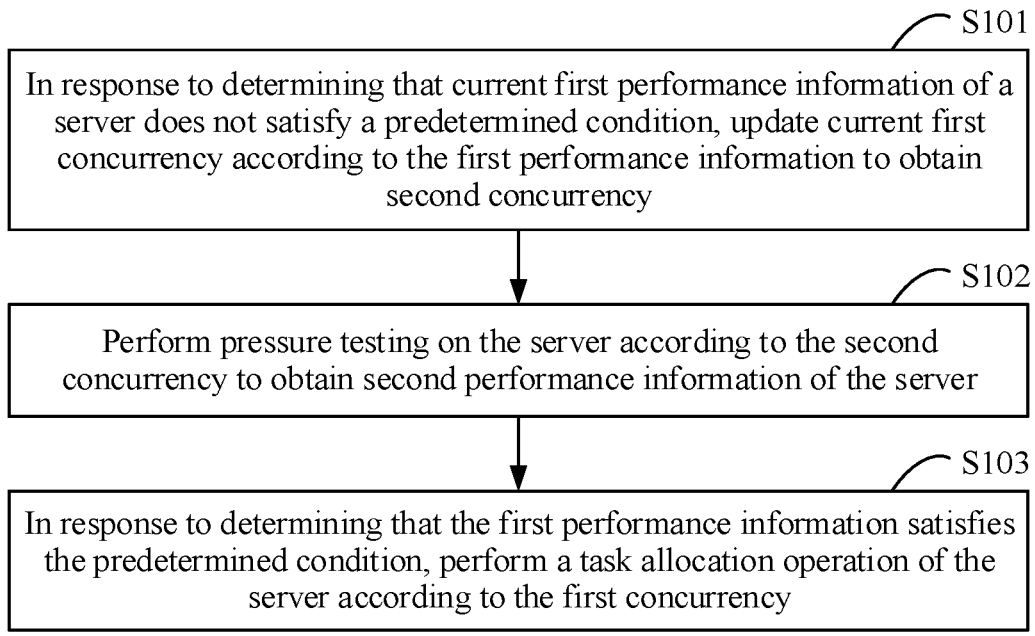
FIG. 1 is a flowchart of a performance testing method according to an embodiment of the present disclosure.

FIG. 1 is a flowchart of a performance testing method according to an embodiment of the present disclosure. This embodiment is applicable to the case where optimal concurrency of a server is acquired. The method in this embodiment may be performed by a performance testing apparatus. The apparatus may be implemented by software and/or hardware and may be configured in an electronic device having a certain data computing capability. The electronic device may be a client device or a server device. The client device is, for example, a mobile phone, a tablet computer, an in-vehicle terminal, or a desktop computer.

In S101, in response to determining that current first performance information of a server does not satisfy a predetermined condition, current first concurrency is updated according to the first performance information so that second concurrency is obtained.

The server refers to a device that requires pressure testing. The server may be a node or a cluster of nodes. Performance information is used for describing performance of the server and may include service performance information and interface performance information. For example, the interface performance information may include at least one of response time, a system throughput (also referred to as Transaction Per Second, TPS), or the like, and the service performance information may include at least one of a hardware resource situation (a central processing unit (CPU), a hard disk, and a magnetic disk), a network resource occupation situation, network traffic, or input-output (IO) of the magnetic disk, or the like. The current first performance information refers to performance information of the server in a current round of pressure testing. For example, the first performance information is the performance information of the server subjected to the pressure testing based on the first concurrency.

The predetermined condition is used for determining whether the pressure testing ends, for example, for detecting whether the performance information of the server is performance information corresponding to maximum affordable pressure, so as to ensure the availability and reliability of the server. The maximum affordable pressure is a maximum pressure value satisfying performance availability instead of an extreme pressure value of the server. If the first performance information does not satisfy the predetermined condition, it indicates that the server can afford higher pressure.

Concurrency refers to the number of requests sent to the server within a period of time and may be, for example, the number of requests per second. The concurrency is used for characterizing the pressure affordable by the server. The pressure testing performed on the server may refer to testing whether the server can afford such pressure and testing whether the server affording the pressure reaches a performance bottleneck. Generally, to obtain the optimal concurrency or maximum concurrency affordable by the server, the pressure testing needs to be performed multiple times. Each time the pressure testing is performed on the server, different concurrency is used. The current first concurrency refers to the number of requests to be sent to the server in the current round of pressure testing. The second concurrency refers to the number of requests to be sent to the server in a next round of pressure testing.

The update of the current first concurrency according to the first performance information may be adjusting the first concurrency according to a real-time change situation of the first performance information and a difference between the first performance information and performance information satisfying requirements, so as to obtain the second concurrency and continue the pressure testing on the server.

In S102, the pressure testing is performed on the server according to the second concurrency so that second performance information of the server is obtained.

The second performance information refers to performance information of the server in the next round of pressure testing and may also be the performance information of the server subjected to the pressure testing based on the second concurrency. In fact, the pressure testing is performed on the server according to the first concurrency so that the first performance information is obtained, and the pressure testing is performed on the server according to the second concurrency so that the second performance information is obtained. The pressure testing is performed again on the server according to the second concurrency so that new performance information is obtained and determined to be the second performance information. Thus, the next round of pressure testing is performed. At this time, the next round may be determined to be the current round. Accordingly, the second performance information is determined to be the first performance information, the second concurrency is determined to be the first concurrency, and whether the first performance information satisfies the predetermined condition is detected so that the concurrency is repeatedly updated and the pressure testing is repeatedly performed on the server.

In S103, in response to determining that the first performance information satisfies the predetermined condition, a task allocation operation of the server is performed according to the first concurrency.

If the first performance information satisfies the predetermined condition, it indicates that the server has reached the maximum affordable pressure and the pressure testing ends. The first concurrency satisfying the predetermined condition may refer to maximum affordable concurrency of the server satisfying the performance requirement, that is, the maximum affordable pressure of the server in the case where the performance requirement is satisfied. The first concurrency satisfying the predetermined condition is used for task allocation of the server. The task allocation operation is used for allocating tasks to the server. The task allocation operation may be used for allocating the number and types of to-be-executed tasks to the server and may also be used for selecting some servers from multiple servers and allocating the number and types of to-be-executed tasks to the selected servers.

The pressure testing is performed on the server according to the first concurrency so that the first performance information of the server is acquired. In the case where the first performance information satisfies the predetermined condition, the task allocation operation of the server is performed according to the first concurrency. In the case where the current performance information does not satisfy the predetermined condition, the first concurrency is updated according to the first performance information so that the second concurrency is obtained, and the pressure testing is performed again according to the second concurrency so that the second performance information is obtained. In the next round, the second performance information is determined to be the first performance information, the second concurrency is determined to be the first concurrency, and whether the first performance information satisfies the predetermined condition continues to be detected until first performance information satisfying the predetermined condition is determined. The pressure testing is ended.

Additionally, the number of times the pressure testing is performed may also be configured. If the number of times the pressure testing is performed exceeds a preset number threshold, it may be determined that the server has no first performance information satisfying the predetermined condition. Thus, it may be determined that the pressure testing of the server fails and no task allocation operation is performed for the server, that is, no task is allocated to the server.

In most existing methods, a user adjusts pressure in real time according to a pressure detection situation, causing a relatively high labor cost and low efficiency of performance testing. The existing pressure testing uses the extreme pressure value of the server as an ending condition. As a result, no appropriate task can be allocated to the server according to the extreme pressure value obtained through the pressure testing.

According to the technical solution of the present disclosure, in the case where the first performance information does not satisfy the predetermined condition, the current first concurrency is updated based on the first performance information in the current round of pressure testing so that the second concurrency is obtained, and the next round of pressure testing is performed according to the second concurrency so that the second performance information is obtained; and in the case where the first performance information satisfies the predetermined condition, the tasks are allocated to the server according to the current first concurrency. In this manner, automatic performance testing can be implemented, reducing a testing cost. Moreover, the concurrency can be adjusted in real time according to a testing situation, improving the detection efficiency of concurrency. Meanwhile, the concurrency of the server for available performance can be obtained so that the tasks are allocated to the server, the reliability of concurrency is improved, and the availability of the server is ensured.

Figure 2:
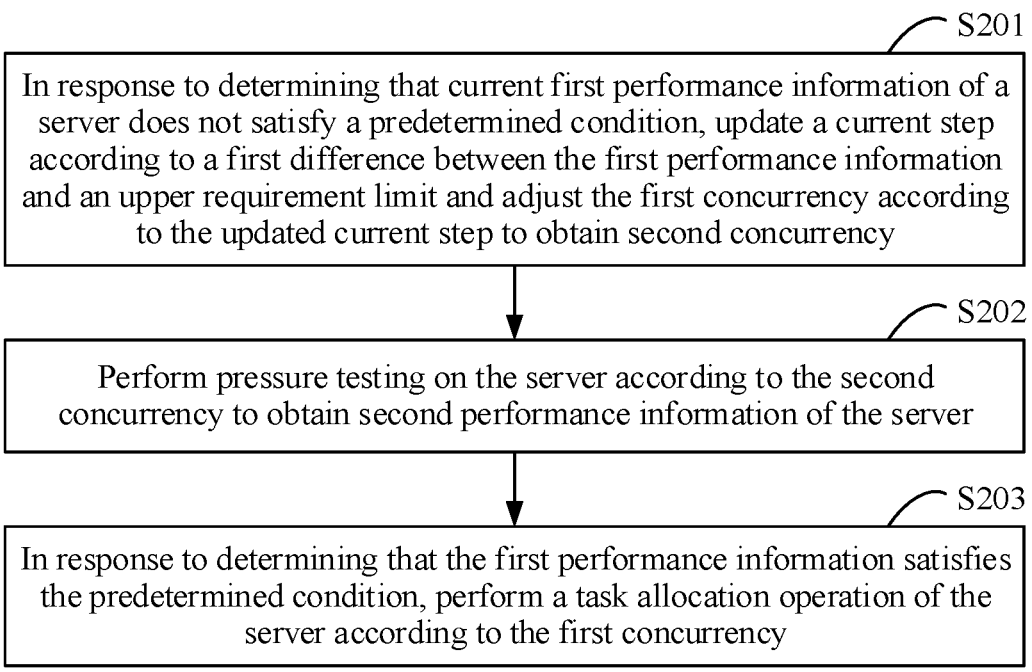
FIG. 2 is a flowchart of another performance testing method according to an embodiment of the present disclosure.

FIG. 2 is a flowchart of another performance testing method according to an embodiment of the present disclosure. This embodiment is an optimization and expansion of the preceding technical solution and can be combined with each preceding optional implementation. That the current first concurrency is updated according to the first performance information so that the second concurrency is obtained may include that a current step is updated according to a first difference between the first performance information and an upper requirement limit and the first concurrency is adjusted according to the updated current step so that the second concurrency is obtained.

In S201, in response to determining that current first performance information of a server does not satisfy a predetermined condition, a current step is updated according to a first difference between the first performance information and an upper requirement limit and first concurrency is adjusted according to the updated current step so that second concurrency is obtained.

The upper requirement limit refers to a maximum value for describing that the first performance information satisfies business requirement performance. A larger value of some performances indicates better performance and a smaller value indicates worse performance; a smaller value of some performances indicates better performance and a larger value indicates worse performance. For example, performance information is response time, and less response time indicates better performance. For example, the performance of response time of 1s is better than the performance of response time of 2s. In another example, the performance information is a CPU utilization rate, and a larger CPU utilization rate indicates better performance. For example, the performance of a CPU utilization rate of 80% is better than the performance of a CPU utilization rate of 50%. For performance information whose larger value indicates better performance, the upper requirement limit is configured to avoid that the server can only provide a service requested to be processed and cannot provide a service for another function, resulting in lower availability of the server. For performance information whose larger value indicates worse performance, the upper requirement limit is configured to avoid that the server has too poor performance to provide an available service.

The upper requirement limit indicates that the first performance information has reached a maximum value of a business requirement, and if the first performance information is further increased, the increased first performance information cannot satisfy the business requirement and the server is unavailable. In the preceding example, the first performance information is the response time. The first performance information increases as the first concurrency increases. When the first performance information is 10s, it is determined that the first performance information is the same as the upper requirement limit. If the response time is further increased, it is determined that the server is unavailable.

The first difference represents an amplitude within which the first performance information is variable and for example, a numerical range in which the first performance information is variable. The current step is used for adjusting the first concurrency. The current step may refer to a degree to which the first concurrency is variable and for example, a numerical range in which the first concurrency is variable. The first concurrency may be adjusted using a constant current step. In fact, a larger first difference indicates that the first performance information is variable in a larger numerical range, and the current step may be increased so that an amplitude of variation of the first concurrency is greater than the constant current step. The amplitude of variation of the first concurrency is adjusted so that first performance information satisfying the predetermined condition is determined at a faster speed. A smaller first difference indicates that the first performance information is variable in a smaller numerical range, and the current step may be reduced so that the amplitude of variation of the first concurrency is less than the constant current step. The amplitude of variation of the first concurrency is adjusted and the first performance information is slightly adjusted so that the first concurrency is prevented from being increased too fast, which causes too large a first difference between the first performance information and the upper requirement limit and an increase in the number of times pressure testing is performed for the first performance information satisfying the predetermined condition.

Optionally, that the current step is updated according to the first difference between the first performance information and the upper requirement limit and the first concurrency is adjusted according to the updated current step so that the second concurrency is obtained includes the following: in response to determining according to the first difference that the first performance information is greater than the upper requirement limit, the current step is reduced, and a second difference between the first concurrency and the reduced current step is computed so that the second concurrency is obtained.

The first performance information being greater than the upper requirement limit refers to that in the case where the first performance information includes multiple types of performance information, at least one type of performance information is greater than the upper requirement limit and a magnitude relationship between each remaining type of performance information and the upper requirement limit is not limited. If the first performance information is greater than the upper requirement limit, it indicates that the current performance information has exceeded an upper limit, and the first concurrency needs to be reduced so that the second concurrency is obtained and second performance information closest to the upper requirement limit and below the upper requirement limit is determined. It also indicates that the first concurrency is increased too much and should be reduced. Additionally, due to too large a step that forms the first concurrency, the first performance information is greater than the upper requirement limit. Thus, the step that forms the first concurrency should be reduced so that the current first concurrency is varied by a smaller amount. In this manner, the first concurrency is varied to a small degree so as to obtain the second concurrency. Therefore, in the case where it is determined that the second performance information is less than the upper requirement limit, the second performance information close to the upper requirement limit is further determined.

If the current step is reduced, it indicates that the amplitude of variation of the first concurrency is reduced. The second difference is a difference between the first concurrency and the updated current step, and the second difference is determined to be the second concurrency. The second difference between the first concurrency and the updated current step is computed and determined to be the second concurrency, which indicates that the first concurrency is reduced, and the second concurrency obtained after the reduction is equivalent to concurrency increased to a small degree based on first concurrency before the current first concurrency. If the current step is not reduced, the second concurrency will become the last first concurrency, and thus the pressure testing is performed according to the repeated concurrency, reducing the detection efficiency of the pressure testing. For example, reducing the current step may be halving the current step.

In the case where the first performance information is greater than the upper requirement limit, the current step is reduced and the first concurrency is reduced according to the reduced current step so that the second concurrency is obtained. Therefore, an increment in concurrency is reduced based on the concurrency before the first concurrency so that the second performance information approaches the upper requirement limit in the case where the second performance information is less than the upper requirement limit. The step and the concurrency are adjusted in time according to the situation of the first performance information so that the step and the concurrency are flexibly adjusted and the detection efficiency of the first performance information satisfying the predetermined condition is improved.

Optionally, that the current step is updated according to the first difference between the first performance information and the upper requirement limit and the first concurrency is adjusted according to the updated current step so that the second concurrency is obtained includes the following: in the case where the first performance information is less than the upper requirement limit, a growth relationship between performance information and concurrency is detected; in the case where the growth relationship is a linear relationship, the first difference between the first performance information and the upper requirement limit is computed; a growth coefficient of the current step is determined according to the first difference and the current step is updated; and a sum of the first concurrency and the updated current step is computed so that the second concurrency is obtained.

The first performance information being less than the upper requirement limit refers to that in the case where the first performance information includes multiple types of performance information, each type of performance information is less than the upper requirement limit. If the first performance information is less than the upper requirement limit, it indicates that the first performance information can continue to be increased, that is, the first concurrency can continue to be increased for testing. The growth relationship may include the linear relationship and a non-linear relationship. The growth relationship between performance information and concurrency is used for describing whether the performance information increases linearly with the growth of the concurrency. In fact, a relationship curve between performance information and concurrency may be that the performance information increases linearly and then non-linearly with the growth of the concurrency to reach a first turning point, then the performance information decreases with the growth of the concurrency to reach a second turning point, and then the performance information remains constant with the growth of the concurrency. If the growth relationship is linear, it indicates that the performance information increases rapidly with the growth of the concurrency. In this case, the current step may be increased so that the first concurrency is increased to a large degree, accelerating the detection speed of the first performance information satisfying the predetermined condition.

The difference between the first performance information and the upper requirement limit is used for determining an amplitude of growth of the current step. The growth coefficient is used for increasing the current step and may refer to a value for describing the amplitude of growth of the current step. If the sum of the first concurrency and the updated current step is computed, it indicates that the first concurrency is increased. The growth coefficient is determined according to the first difference and the current step is updated, which may be understood as the dynamic growth of the step.

For example, the first performance information includes at least one type of performance information, and whether the growth relationship is the linear relationship may be detected based on only a relationship between throughput and concurrency. The linear relationship between throughput and concurrency is expressed as follows:

$$f_{tps}(x)=kx+a$$

x denotes concurrency, $f_{tps}(x)$ denotes throughput, and k and a denote constants. A linear equation may be fitted according to the throughput and the concurrency. If an equation as described in the preceding formula can be obtained, the growth relationship is determined to be the linear relationship; otherwise, the growth relationship is the non-linear relationship.

For example, the current step dynamically varied is $s_{(i+1)}=\alpha s_i$, where s denotes the current step and $\alpha$ denotes the growth coefficient. The growth coefficient is computed by the following formula:

$$\alpha = \min\left(\frac{c_{max} - c_i}{c_i - c_{i-1}}, \frac{m_{max} - m_i}{m_i - m_{i-1}}, \frac{d_{max} - d_i}{d_i - d_{i-1}}, \ldots\ldots\right)$$

$c_{max}$ denotes an upper requirement limit of a CPU utilization rate, $m_{max}$ denotes an upper requirement limit of a memory usage rate, and $d_{max}$ denotes an upper requirement limit of an IO usage rate of a magnetic disk. Meanwhile, parameters such as network and system load may be added. i denotes a current time and i−1 denotes a last time. A minimum value is used as the growth coefficient of the step. Additionally, i is greater than 1. Pressure testing for the first time is a reference pressure testing for which first concurrency may be preset. A current step for pressure testing for the second time may be determined according to first performance information of the reference pressure testing and a preset correspondence relationship with the current step.

In the case where the first performance information is less than the upper requirement limit, if it is determined that the growth relationship between the first performance information and the first concurrency is linear, the growth coefficient is determined according to the difference between the first performance information and the upper requirement limit and the current step is increased so that an increment of the first concurrency is increased. In the phase during which the first performance information increases rapidly with the first concurrency, the first concurrency may be increased rapidly, improving the detection efficiency of the first performance information satisfying the predetermined condition.

Optionally, the performance testing method further includes the following: in the case where the growth relationship is the non-linear relationship, the current step is reduced; and a sum of the first concurrency and the reduced current step is computed so that the second concurrency is obtained.

As can be seen from the preceding description, if the growth relationship is non-linear, it indicates that the performance information increases slowly with the growth of the concurrency. In this case, the first performance information is close to the upper requirement limit, and the step may be reduced so that the first concurrency is increased to a small degree and the first performance information is slightly adjusted to approximate to the upper requirement limit. Therefore, the first concurrency is prevented from being increased to a large degree, which causes the first performance information to exceed the upper requirement limit and an increase in the number of times the concurrency is adjusted.

If the current step is reduced, it indicates that an amplitude of growth of the first concurrency is reduced. If the sum of the first concurrency and the reduced current step is computed, it indicates that the first concurrency is increased. The growth coefficient is determined according to the first difference and the current step is updated, which may be understood as the dynamic growth of the step.

In the case where the first performance information is less than the upper requirement limit, if it is determined that the growth relationship between the first performance information and the first concurrency is non-linear, the current step is reduced so that the increment of the first concurrency is reduced. When the first performance information increases slowly with the first concurrency, the first concurrency may be increased slowly, improving the detection efficiency of the first performance information satisfying the predetermined condition.

In S202, the pressure testing is performed on the server according to the second concurrency so that the second performance information of the server is obtained.

In S203, in response to determining that the first performance information satisfies the predetermined condition, a task allocation operation of the server is performed according to the first concurrency.

According to the technical solution of the present disclosure, the current step is updated according to the first difference between the first performance information and the upper requirement limit, and the first concurrency is adjusted according to the updated current step. In this manner, the step is adjusted according to the difference between the first performance information varying in real time and the upper requirement limit to be reached and a variation of the first concurrency is adjusted so that the speed of the pressure testing can be accelerated, the first performance information satisfying the predetermined condition can be rapidly determined, and the detection efficiency of the first performance information satisfying the predetermined condition can be improved.

Figure 3:
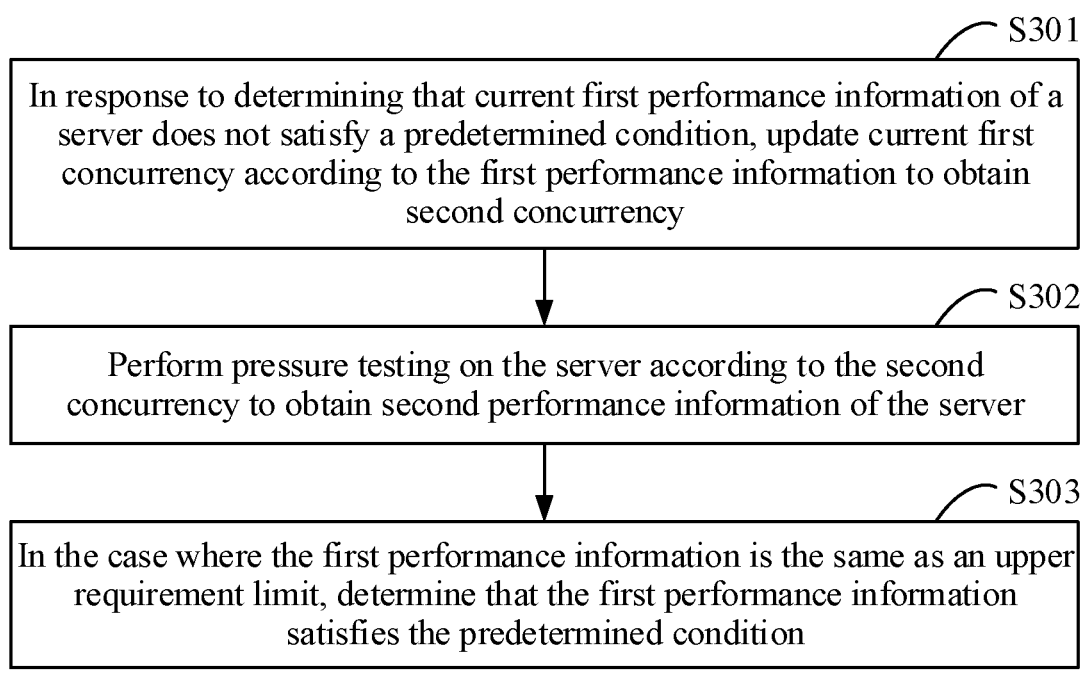
FIG. 3 is a flowchart of another performance testing method according to an embodiment of the present disclosure.

FIG. 3 is a flowchart of another performance testing method according to an embodiment of the present disclosure. This embodiment is an optimization and expansion of the preceding technical solution and can be combined with each preceding optional implementation. Current performance information satisfying a predetermined condition includes that in the case where the current performance information is the same as an upper requirement limit, it is determined that the current performance information satisfies the predetermined condition.

In S301, in response to determining that current first performance information of a server does not satisfy a predetermined condition, current first concurrency is updated according to the first performance information so that second concurrency is obtained.

The predetermined condition may refer to the detection of whether the first performance information is the same as an upper requirement limit. The upper requirement limit is used for detecting whether the first performance information satisfies the predetermined condition. If the current first performance information of the server is different from the upper requirement limit, it indicates that the first performance information does not satisfy the predetermined condition.

Reference pressure testing may be performed on the server in advance, that is, pressure testing is performed on the server according to preset reference concurrency so that reference performance information corresponding to the reference concurrency is acquired. In the case where the reference performance information is greater than the upper requirement limit, it is determined that the pressure testing fails and a user is prompted to optimize the server. The reference concurrency is generally 1. If the reference performance information is greater than the upper requirement limit, it indicates that the server cannot satisfy a performance requirement with minimum concurrency. Thus, there is no need to perform the pressure testing on the server based on larger concurrency and the server needs to be redeveloped.

In fact, that the first performance information is equal to the upper requirement limit refers to that in the case where the first performance information includes multiple types of performance information, at least one type of performance information is less than the upper requirement limit, at least one type of performance information is equal to the upper requirement limit, and no other type of performance information is greater than the upper requirement limit. Thus, in the case where any performance information is greater than the upper requirement limit, the concurrency needs to be reduced until it is determined that at least one type of performance information is less than the upper requirement limit and at least one type of performance information is equal to the upper requirement limit, and the pressure testing is ended.

In S302, the pressure testing is performed on the server according to the second concurrency so that second performance information of the server is obtained.

In S303, in the case where the first performance information is the same as the upper requirement limit, it is determined that the first performance information satisfies the predetermined condition, where the upper requirement limit is determined according to task allocation information, and the task allocation information includes at least one of allocatable resources or performance requirement information.

The task allocation information is used for determining the upper requirement limit. The task allocation information may refer to information associated with a task allocated to the server and may also refer to performance information required for a service provided by the server. The task allocation information includes at least one of the allocatable resources or the performance requirement information. The allocatable resources are used by the server to process requests. For example, the allocatable resources may include a CPU and/or a memory. In fact, resources of the server need to be supplied to different applications, and the requests are only a part. Therefore, the upper requirement limit may be determined according to resources allocatable to the server for request processing. For example, not all resources are allocated to the server for request processing, and accordingly, a resource usage rate does not reach 100%. For example, the resources allocated for request processing are determined according to a type of the service provided by the server, and an upper limit of the resource usage rate, that is, the upper requirement limit of the resource usage rate, is determined.

For example, the server has too poor performance to satisfy the requirement of the user, so the server is unavailable. For example, the performance of the server is response time. If the response time is too long, the response to a request is too slow to satisfy the requirement of the user, so the server is unavailable.

The upper requirement limit is determined according to the allocatable resources and the performance requirement information so that target concurrency obtained through the pressure testing does not affect the availability of the server, improving the detection accuracy of the target concurrency and the performance stability of the server.

The first performance information and the upper requirement limit indicate that the first performance information has reached a maximum value of a business requirement, and if the first performance information further increases, the increased first performance information cannot satisfy the business requirement and the server is unavailable. In the preceding example, the first performance information is the response time. The first performance information increases as the concurrency increases. When the first performance information is 10s, it is determined that the first performance information is the same as the upper requirement limit. If the response time is further increased, it is determined that the server is unavailable.

In fact, as the concurrency increases, the performance becomes better and then worse and finally tends to be stable. Generally, as the concurrency increases, the performance becomes better to a first turning point and then becomes worse, where concurrency corresponding to the first turning point is optimal concurrency affordable by the server; as the concurrency continues to increase, the performance continues to deteriorate to a second turning point until the performance tends to be stable, where concurrency corresponding to the second turning point is maximum concurrency affordable by the server. The optimal concurrency and the maximum concurrency of the server may be determined from the relationship between performance and concurrency. However, in actual application, due to limitations by the business requirement of the server, the performance of the server is unavailable before reaching the first turning point.

Therefore, the acquired concurrency corresponding to the first turning point and the acquired concurrency corresponding to the second turning point cannot be applied in actual application scenarios. The upper requirement limit is defined by requirement conditions so that the value of the performance satisfying the business requirement can be determined, ensuring that the server is available.

The first performance information includes at least one type of performance information. In the case where there are at least two types of performance information, that the first performance information is the same as the upper requirement limit may refer to that a certain type of performance information is the same as the corresponding upper requirement limit and each remaining type of performance information is less than or equal to the corresponding upper requirement limit.

In S304, a task allocation operation of the server is performed according to the first concurrency.

According to the technical solution of the present disclosure, the predetermined condition is whether the first performance information is equal to the upper requirement limit and serves as a condition for the pressure testing to end, which can ensure that the server is available and can be applied to different application scenarios to flexibly control concurrency and improve the reliability of the server based on the first concurrency.

Figure 4:
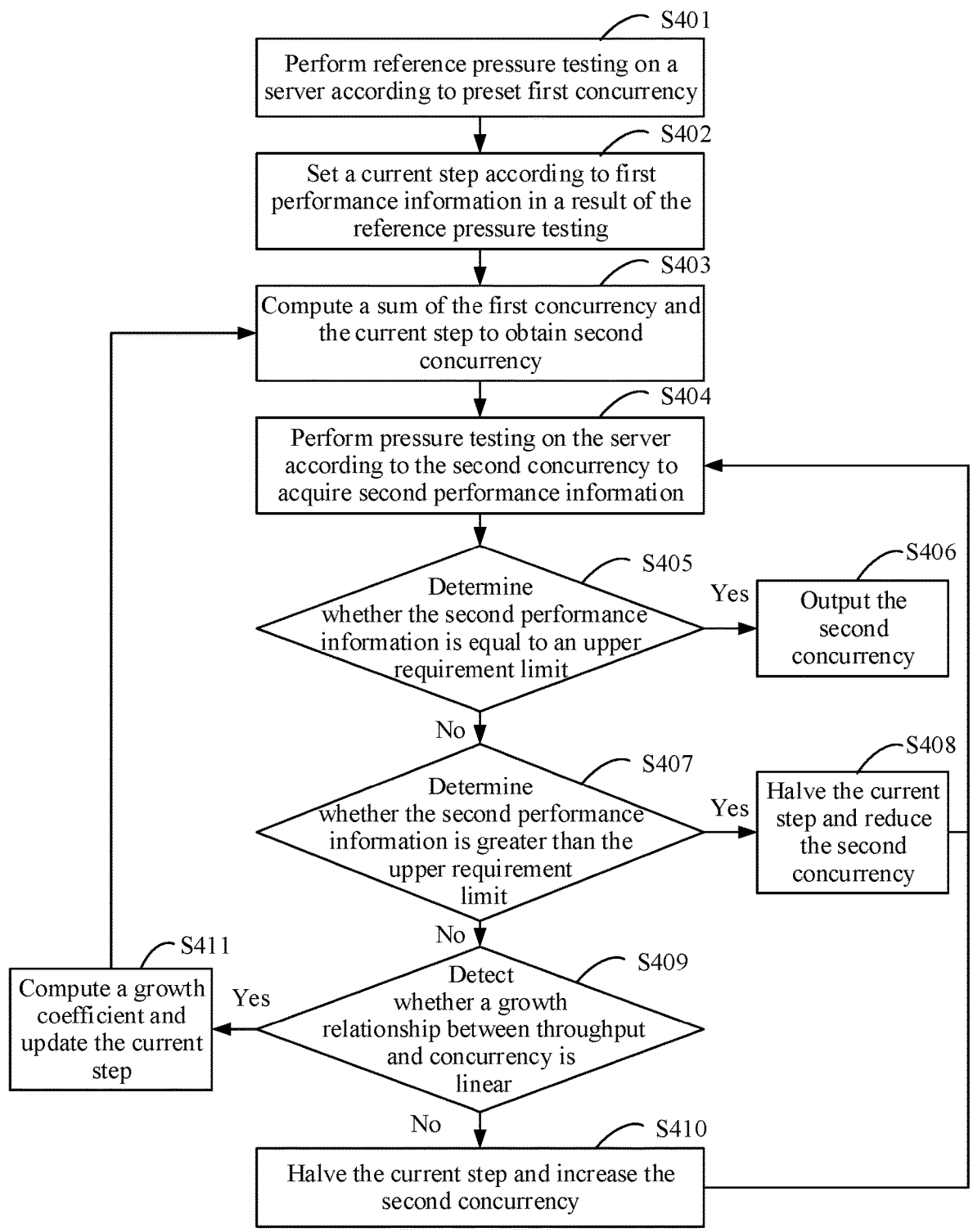
FIG. 4 is a flowchart of another performance testing method according to an embodiment of the present disclosure.

FIG. 4 is a flowchart of another performance testing method according to an embodiment of the present disclosure. The performance testing method may include S401 to S411.

In S401, reference pressure testing is performed on a server by adopting preset first concurrency.

The pressure testing is started and the concurrency is set to 1 (reference testing) so that performance information of the reference pressure testing is acquired, where the performance information may include at least one of response time, throughput, a CPU utilization rate, a memory usage rate, network traffic, or IO of a magnetic disk.

S402, a current step is set according to first performance information in a result of the reference pressure testing.

A gradient of increase of the concurrency is designed according to the situation of the reference pressure testing. The concurrency starts to be increased. For example, the current step may be determined according to the first performance information of the reference pressure testing and an upper requirement limit. A correspondence relationship between the current step, the first performance information, and the upper requirement limit of the reference pressure testing may be determined according to experimental statistics so that the current step is determined according to the correspondence relationship.

In S403, a sum of the first concurrency and the current step is computed so that second concurrency is obtained.

In S404, the pressure testing is performed on the server according to the second concurrency so that second performance information is acquired.

The first concurrency and the second concurrency refer to the same concurrency in different rounds. The first performance information and the second performance information refer to the same performance information in different rounds.

In S405, it is determined whether the second performance information is equal to the upper requirement limit. If so, S406 is performed. Otherwise, S407 is performed.

In S406, the second concurrency is output.

If the second performance information, that is, current first performance information, is equal to the upper requirement limit, the pressure testing is ended. The second concurrency is maximum affordable capacity.

In S407, it is determined whether the second performance information is greater than the upper requirement limit. If so, S408 is performed. Otherwise, S409 is performed.

In S408, the current step is halved, the second concurrency is reduced, and S404 is performed.

The second concurrency is reduced according to the halved current step, and then the pressure testing is performed.

In S409, it is detected whether a growth relationship between throughput and concurrency is linear. If so, S411 is performed. Otherwise, S410 is performed.

The values of response time and throughput in this time are collected, and a relationship graph of indicators such as the throughput, the response time, and a CPU utilization rate with the concurrency is plotted. Whether the growth relationship between throughput and concurrency is linear is mainly detected.

A linear relationship between throughput and concurrency is expressed as follows:

$$f_{tps}(x)=kx+a$$

Fitting is performed according to the formula and whether k is a constant is detected so that whether the growth relationship is linear is detected.

In S410, the current step is halved, the second concurrency is increased, and S404 is performed.

The second concurrency is increased according to the halved current step, and then the pressure testing is performed.

In S411, a growth coefficient is computed, the current step is updated, and S403 is performed.

Whether a growth rate of the throughput has a linear relationship with a growth rate of the concurrency is determined. In response to the linear relationship, the current step is computed by a dynamic step computation formula, and the second concurrency is increased.

The current step is $s_{(i+1)}=\alpha s_i$, where s denotes the current step and a denotes the growth coefficient. The growth coefficient is computed by the following formula:

$$\alpha = \min\left(\frac{c_{max} - c_i}{c_i - c_{i-1}}, \frac{m_{max} - m_i}{m_i - m_{i-1}}, \frac{d_{max} - d_i}{d_i - d_{i-1}}, \ldots\ldots\right)$$

Additionally, the following steps need to be performed before the pressure testing.

In a first step, information such as scene and pressure are configured, and monitoring information is configured.

In a second step, an upper requirement limit of performance information is configured, such as an upper requirement limit of the response time and an upper requirement limit of the throughput.

In a third step, an upper requirement limit of service performance information is configured, such as an upper requirement limit of the CPU utilization rate, an upper requirement limit of the memory usage rate, an upper requirement limit of the network traffic, and an upper requirement limit of the IO of the magnetic disk.

In a fourth step, a testing scene is started.

In a fifth step, the server automatically adjusts the pressure and outputs the maximum affordable capacity of the server, that is, target concurrency.

According to the technical solution of the present disclosure, data such as performance monitoring indicators and interface performance indicators of the server for performance testing is configured, and there is no need to manually monitor performance indicators of the server; the pressure to be tested is automatically adjusted, and there is no need to manually modify the concurrent pressure of a script; maximum affordable concurrency of the server within the range of an upper limit of the performance indicators is automatically detected; the pressure is rapidly increased, and the time for finding a performance bottleneck is shortened.

Figure 5:
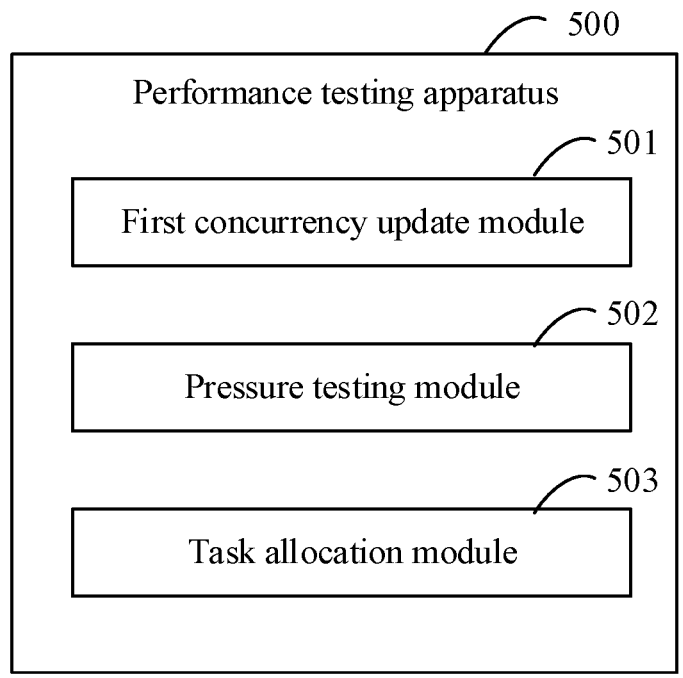
FIG. 5 is a structural diagram of a performance testing apparatus according to an embodiment of the present disclosure.

According to an embodiment of the present disclosure, FIG. 5 is a structural diagram of a performance testing apparatus according to an embodiment of the present disclosure. The embodiment of the present disclosure is applicable to the case where optimal concurrency of service interface performance is acquired. The apparatus is implemented by software and/or hardware and may be configured in an electronic device having a certain data computing capability.

As shown in FIG. 5, a performance testing apparatus 500 includes a first concurrency update module 501, a pressure testing module 502, and a task allocation module 503.

The first concurrency update module 501 is configured to: in response to determining that current first performance information of a server does not satisfy a predetermined condition, update current first concurrency according to the first performance information to obtain second concurrency.

The pressure testing module 502 is configured to perform pressure testing on the server according to the second concurrency to obtain second performance information of the server.

The task allocation module 503 is configured to: in response to determining that the first performance information satisfies the predetermined condition, perform a task allocation operation of the server according to the first concurrency.

According to the technical solution of the present disclosure, in the case where the first performance information does not satisfy the predetermined condition, the current first concurrency is updated based on the first performance information in a current round of pressure testing so that the second concurrency is obtained, and a next round of pressure testing is performed according to the second concurrency so that the second performance information is obtained; and in the case where the first performance information satisfies the predetermined condition, tasks are allocated to the server according to the current first concurrency. In this manner, automatic performance testing can be implemented, reducing a testing cost. Moreover, the concurrency can be adjusted in real time according to a testing situation, improving the detection efficiency of concurrency. Meanwhile, the concurrency of the server for available performance can be obtained so that the tasks are allocated to the server, the reliability of concurrency is improved, and the availability of the server is ensured.

Further, the first concurrency update module 501 includes a second concurrency computation unit. The second concurrency computation unit is configured to update a current step according to a first difference between the first performance information and an upper requirement limit and adjust the first concurrency according to the updated current step to obtain the second concurrency.

Further, the second concurrency computation unit includes a step reduction subunit and a concurrency reduction subunit. The step reduction subunit is configured to: in response to determining according to the first difference that the first performance information is greater than the upper requirement limit, reduce the current step. The concurrency reduction subunit is configured to compute a second difference between the first concurrency and the reduced current step to obtain the second concurrency.

Further, the second concurrency computation unit includes a performance increase linearity detection subunit, an upper limit difference detection subunit, a linear update subunit, and a concurrency increment increase subunit. The performance increase linearity detection subunit is configured to: in the case where the first performance information is less than the upper requirement limit, detect a growth relationship between performance information and concurrency. The upper limit difference detection subunit is configured to: in the case where the growth relationship is a linear relationship, compute the first difference between the first performance information and the upper requirement limit. The linear update subunit is configured to determine a growth coefficient of the current step according to the first difference and update the current step. The concurrency increment increase subunit is configured to compute a sum of the first concurrency and the updated current step to obtain the second concurrency.

Further, the performance testing apparatus further includes a non-linear update subunit and a concurrency increase subunit. The non-linear update subunit is configured to: in the case where the growth relationship is a non-linear relationship, reduce the current step. The concurrency increase subunit is configured to compute a sum of the first concurrency and the reduced current step to obtain the second concurrency.

Further, the task allocation module 503 includes an upper performance limit detection unit. The upper performance limit detection unit is configured to: in the case where the first performance information is the same as the upper requirement limit, determine that the first performance information satisfies the predetermined condition, where the upper requirement limit is determined according to task allocation information, and the task allocation information includes at least one of allocatable resources or performance requirement information.

The preceding performance testing apparatus may perform the performance testing method provided by any one of embodiments of the present disclosure and has function modules and beneficial effects corresponding to the performed performance testing method.

In the technical solutions of the present disclosure, the collection, storage, use, processing, transmission, provision, and disclosure of user personal information involved are in compliance with provisions of relevant laws and regulations and do not violate public order and good customs.

According to embodiments of the present disclosure, the present disclosure further provides an electronic device, a readable storage medium and a computer program product.

Figure 6:
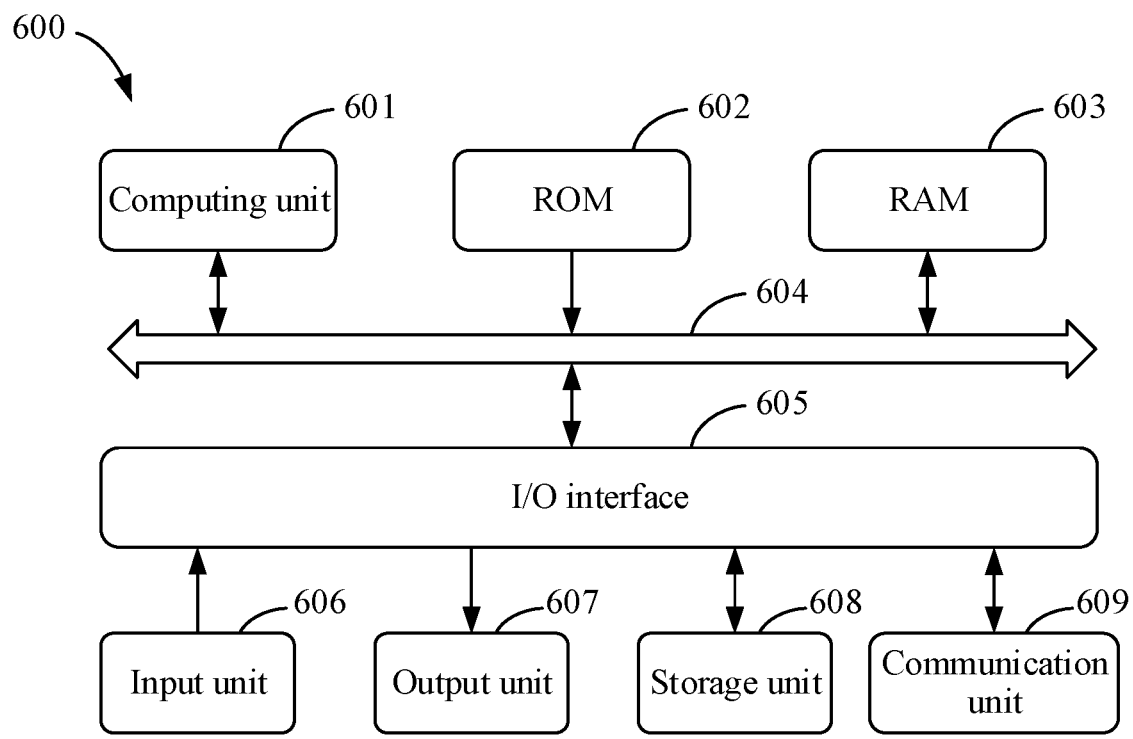
FIG. 6 is a block diagram of an electronic device for implementing a performance testing method according to an embodiment of the present disclosure.

FIG. 6 is a block diagram illustrative of an exemplary electronic device 600 that may be used for implementing embodiments of the present disclosure. The electronic device is intended to represent various forms of digital computers, for example, laptop computers, desktop computers, worktables, personal digital assistants, servers, blade servers, mainframe computers, and other applicable computers. The electronic device may also represent various forms of mobile devices, for example, personal digital assistants, cellphones, smartphones, wearable devices, and other similar computing devices. Herein the shown components, the connections and relationships between these components, and the functions of these components are illustrative only and are not intended to limit the implementation of the present disclosure as described and/or claimed herein.

As shown in FIG. 6, the device 600 includes a computing unit 601. The computing unit 601 may perform various appropriate actions and processing according to a computer program stored in a read-only memory (ROM) 602 or a computer program loaded into a random-access memory (RAM) 603 from a storage unit 608. Various programs and data required for operations of the device 600 may also be stored in the RAM 603. The computing unit 601, the ROM 602, and the RAM 603 are connected to each other through a bus 604. An input/output (I/O) interface 605 is also connected to the bus 604.

Multiple components in the device 600 are connected to the I/O interface 605. The multiple components include an input unit 606 such as a keyboard and a mouse, an output unit 607 such as various types of display and speaker, the storage unit 608 such as a magnetic disk and an optical disk, and a communication unit 609 such as a network card, a modem, and a wireless communication transceiver. The communication unit 609 allows the device 600 to exchange information/data with other devices over a computer network such as the Internet and/or over various telecommunication networks.

The computing unit 601 may be various general-purpose and/or special-purpose processing components having processing and computing capabilities. Examples of the computing unit 601 include, but are not limited to, a CPU, a graphics processing unit (GPU), a special-purpose artificial intelligence (AI) computing chip, a computing unit executing machine learning model algorithms, a digital signal processor (DSP), and any appropriate processor, controller, and microcontroller. The computing unit 601 performs the preceding methods and processing, such as a performance testing method. For example, in some embodiments, the performance testing method may be implemented as a computer software program tangibly contained in a machine-readable medium such as the storage unit 608. In some embodiments, part or all of a computer program may be loaded and/or installed on the device 600 via the ROM 602 and/or the communication unit 609. When the computer program is loaded onto the RAM 603 and executed by the computing unit 601, one or more steps of the preceding performance testing method may be performed. Alternatively, in other embodiments, the computing unit 601 may be configured, in any other suitable manner (for example, by means of firmware), to perform the performance testing method.

Herein various implementations of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various implementations may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device, and at least one output device and transmitting data and instructions to the memory system, the at least one input device, and the at least one output device.

Program codes for implementation of the method of the present disclosure may be written in any combination of one or more programming languages. These program codes may be provided for the processor or controller of a general-purpose computer, a special-purpose computer, or another programmable data processing device to enable functions/operations specified in a flowchart and/or a block diagram to be implemented when the program codes are executed by the processor or controller. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that may contain or store a program available for an instruction execution system, apparatus, or device or a program used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device or any appropriate combination thereof. Concrete examples of the machine-readable storage medium include an electrical connection based on one or more wires, a portable computer disk, a hard disk, a RAM, a ROM, an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user; and a keyboard and a pointing device (for example, a mouse or a trackball) through which the user can provide input for the computer. Other types of devices may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), and the Internet.

A computer system may include clients and servers. A client and a server are generally remote from each other and typically interact through a communication network. The relationship between the client and the server arises by virtue of computer programs running on respective computers and having a client-server relationship to each other. The server may be a cloud server, a server of a distributed system, or a server combined with a blockchain.

It is to be understood that various forms of the preceding flows may be used, with steps reordered, added, or removed. For example, steps described in the present disclosure may be executed in parallel, in sequence, or in a different order as long as the desired results of the technical solutions disclosed in the present disclosure are achieved. The execution sequence of the steps is not limited herein.

The scope of the present disclosure is not limited to the preceding embodiments. It is to be understood by those skilled in the art that various modifications, combinations, subcombinations, and substitutions may be made according to design requirements and other factors. Any modifications, equivalent substitutions, improvements, and the like made within the spirit and principle of the present disclosure fall within the scope of the present disclosure.

What is claimed is:

1. A performance testing method, comprising:
in response to determining that current first performance information of a server does not satisfy a predetermined condition, updating current first concurrency according to the first performance information to obtain second concurrency;
performing pressure testing on the server according to the second concurrency to obtain second performance information of the server; and
in response to determining that the first performance information satisfies the predetermined condition, performing a task allocation operation of the server according to the first concurrency,
wherein updating the current first concurrency according to the first performance information to obtain the second concurrency comprises:
updating a current step according to a first difference between the first performance information and an upper requirement limit and adjusting the first concurrency according to the updated current step to obtain the second concurrency;
wherein updating the current step according to the first difference between the first performance information and the upper requirement limit and adjusting the first concurrency according to the updated current step to obtain the second concurrency comprises:
in a case where the first performance information is less than the upper requirement limit, detecting a growth relationship between performance information and concurrency;
in a case where the growth relationship is a linear relationship, computing the first difference between the first performance information and the upper requirement limit;
determining a growth coefficient of the current step according to the first difference and updating the current step; and
computing a sum of the first concurrency and the updated current step to obtain the second concurrency, wherein the method further comprises:
in a case where the growth relationship is a non-linear relationship, reducing the current step, and computing a sum of the first concurrency and the reduced current step to obtain the second concurrency.

2. The method of claim 1, wherein updating the current step according to the first difference between the first performance information and the upper requirement limit and adjusting the first concurrency according to the updated current step to obtain the second concurrency comprises:
in response to determining according to the first difference that the first performance information is greater than the upper requirement limit, reducing the current step; and
computing a second difference between the first concurrency and the reduced current step to obtain the second concurrency.

3. The method of claim 1, wherein determining that the first performance information satisfies the predetermined condition comprises:
in a case where the first performance information is the same as an upper requirement limit, determining that the first performance information satisfies the predetermined condition, wherein the upper requirement limit is determined according to task allocation information, and the task allocation information comprises at least one of allocatable resources or performance requirement information.

4. A performance testing apparatus, comprising:
at least one processor; and
a memory communicatively connected to the at least one processor;
wherein the memory stores an instruction executable by the at least one processor to enable the at least one processor to perform steps in the following modules:
a first concurrency update module, which is configured to: in response to determining that current first performance information of a server does not satisfy a predetermined condition, update current first concurrency according to the first performance information to obtain second concurrency;
a pressure testing module, which is configured to perform pressure testing on the server according to the second concurrency to obtain second performance information of the server; and
a task allocation module, which is configured to: in response to determining that the first performance information satisfies the predetermined condition, perform a task allocation operation of the server according to the first concurrency,
wherein the first concurrency update module comprises:
a second concurrency computation unit, which is configured to update a current step according to a first difference between the first performance information and an upper requirement limit and adjust the first concurrency according to the updated current step to obtain the second concurrency;
wherein the second concurrency computation unit comprises:
a performance increase linearity detection subunit, which is configured to: in a case where the first performance information is less than the upper requirement limit, detect a growth relationship between performance information and concurrency;
an upper limit difference detection subunit, which is configured to: in a case where the growth relationship is a linear relationship, compute the first difference between the first performance information and the upper requirement limit;
a linear update subunit, which is configured to determine a growth coefficient of the current step according to the first difference and update the current step; and
a concurrency increment increase subunit, which is configured to compute a sum of the first concurrency and the updated current step to obtain the second concurrency;
wherein the apparatus further comprises:
a non-linear update subunit, which is configured to: in a case where the growth relationship is a non-linear relationship, reduce the current step; and
a concurrency increase subunit, which is configured to compute a sum of the first concurrency and the reduced current step to obtain the second concurrency.

5. The apparatus of claim 4, wherein the second concurrency computation unit comprises:
a step reduction subunit, which is configured to: in response to determining according to the first difference that the first performance information is greater than the upper requirement limit, reduce the current step; and
a concurrency reduction subunit, which is configured to compute a second difference between the first concurrency and the reduced current step to obtain the second concurrency.

6. The apparatus of claim 4, wherein the task allocation module comprises:
an upper performance limit detection unit, which is configured to: in a case where the first performance information is the same as an upper requirement limit, determine that the first performance information satisfies the predetermined condition, wherein the upper requirement limit is determined according to task allocation information, and the task allocation information comprises at least one of allocatable resources or performance requirement information.

7. A non-transitory computer-readable storage medium, which is configured to store a computer instruction for causing a computer to perform the following steps:
in response to determining that current first performance information of a server does not satisfy a predetermined condition, updating current first concurrency according to the first performance information to obtain second concurrency;
performing pressure testing on the server according to the second concurrency to obtain second performance information of the server; and
in response to determining that the first performance information satisfies the predetermined condition, performing a task allocation operation of the server according to the first concurrency,
wherein updating the current first concurrency according to the first performance information to obtain the second concurrency comprises:
updating a current step according to a first difference between the first performance information and an upper requirement limit and adjusting the first concurrency according to the updated current step to obtain the second concurrency;
wherein updating the current step according to the first difference between the first performance information and the upper requirement limit and adjusting the first concurrency according to the updated current step to obtain the second concurrency comprises:
  in a case where the first performance information is less than the upper requirement limit, detecting a growth relationship between performance information and concurrency;
  in a case where the growth relationship is a linear relationship, computing the first difference between the first performance information and the upper requirement limit;
  determining a growth coefficient of the current step according to the first difference and updating the current step; and
  computing a sum of the first concurrency and the updated current step to obtain the second concurrency;
wherein the computer instruction is further configured to cause the computer to perform the following steps:
  in a case where the growth relationship is a non-linear relationship, reducing the current step; and
  computing a sum of the first concurrency and the reduced current step to obtain the second concurrency.

8. The storage medium of claim 7, wherein updating the current step according to the first difference between the first performance information and the upper requirement limit and adjusting the first concurrency according to the updated current step to obtain the second concurrency comprises:
  in response to determining according to the first difference that the first performance information is greater than the upper requirement limit, reducing the current step; and
  computing a second difference between the first concurrency and the reduced current step to obtain the second concurrency.

9. The storage medium of claim 7, wherein determining that the first performance information satisfies the predetermined condition comprises:
  in a case where the first performance information is the same as an upper requirement limit, determining that the first performance information satisfies the predetermined condition, wherein the upper requirement limit is determined according to task allocation information, and the task allocation information comprises at least one of allocatable resources or performance requirement information.

* * * * *